US00RE34465E

United States Patent [19]

Koeneman et al.

[11] E Patent Number: Re. 34,465

[45] Reissued Date of Patent: Dec. 7, 1993

[54] COLD PLATE SYSTEM FOR ICE DISPENSER

[75] Inventors: Robert M. Koeneman, Oak Brook; Albert L. Schafer, Chicago, both of Ill.

[73] Assignee: Remcor Products Company, Glendale Hts., Ill.

[21] Appl. No.: 3,445

[22] Filed: Jan. 12, 1993

Related U.S. Patent Documents

Reissue of:

[64] Patent No.: 4,300,359
Issued: Nov. 17, 1981
Appl. No.: 65,372
Filed: Aug. 9, 1979

[51] Int. Cl.[5] ..... F25D 3/02; F25C 5/18; B67D 5/62

[52] U.S. Cl. ..... 62/379; 62/344; 62/398; 62/400

[58] Field of Search ..... 62/399, 400, 344, 354, 62/331, 396, 398, 379; 222/146.6

[56] References Cited

U.S. PATENT DOCUMENTS

| | | | |
|---|---|---|---|
| 1,372,135 | 3/1921 | Green | 62/398 |
| 1,596,865 | 8/1926 | Bennett | 62/379 |
| 1,943,938 | 1/1934 | Haydel | 62/398 |
| 2,060,420 | 11/1936 | Houck | 62/398 |
| 2,113,972 | 4/1938 | Adams | 62/400 |
| 2,449,132 | 9/1948 | Lucia | 62/344 |
| 2,469,979 | 5/1949 | Munson et al. | 62/379 X |
| 2,735,591 | 2/1956 | Branchflower | 62/379 X |
| 3,139,501 | 6/1964 | Cook | 62/344 |
| 3,196,628 | 7/1965 | Reynolds | 62/344 |
| 3,369,376 | 2/1968 | Kious | 62/344 |
| 3,605,430 | 9/1971 | Conti | 62/400 |
| 3,744,263 | 7/1973 | Franck et al. | 62/344 |
| 4,088,243 | 5/1978 | Deveson | 62/344 |
| 4,104,889 | 8/1978 | Hoenisch | 62/344 |

*Primary Examiner*—William E. Tapolcai
*Attorney, Agent, or Firm*—Juettner Pyle & Lloyd

[57] ABSTRACT

A cold plate system for an ice dispenser is characterized by an ice pan in communication with a potable ice hopper through an ice feed conduit. A cold plate is in the ice pan, and the arrangement is such that ice in the hopper is transported through the conduit to the ice pan to surround the cold plate. This maintains the ice in the hopper free from any contamination by the cold plate and in a sterile condition for dispensing into beverages, yet ensures that the cold plate will be continuously surrounded by ice, without manual intervention, to properly cool beverages flowing therethrough.

8 Claims, 1 Drawing Sheet

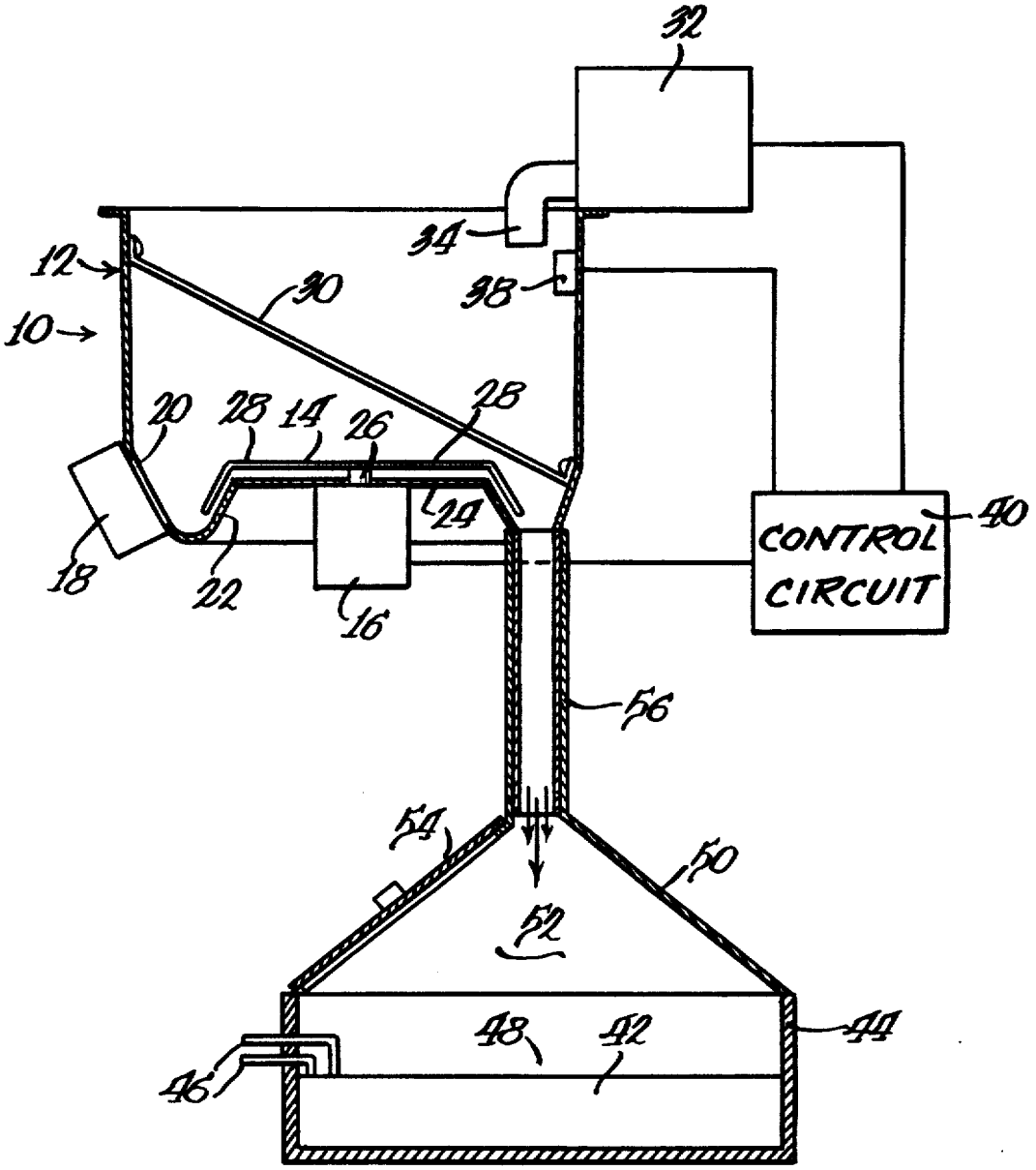
32
34
12
30
38
10
20
28
14
26
28
24
18
22
16
CONTROL
CIRCUIT
40
56
54
50
52
48
42
44
46

COLD PLATE SYSTEM FOR ICE DISPENSER

Matter enclosed in heavy brackets [ ] appears in the original patent but forms no part of this reissue specification; matter printed in italics indicates the additions made by reissue.

BACKGROUND OF THE INVENTION

The present invention relates to a cold plate system for a potable ice dispenser which maintains a supply of ice in a hopper free from any contamination by a cold plate and in a sterile condition, yet ensures that the cold plate is continually cooled by ice from the hopper without manual intervention.

In the food and beverage service industries it is desirable to provide means for expeditiously dispensing a quantity of ice, for example into a glass to facilitate service of ice water and cold beverages to customers. Conventionally, the means comprises an ice dispenser, which for commercial application usually includes a hopper for storing a quantity of crushed, cracked, flaked or cubed ice, an ice maker for manufacturing ice for the hopper, a thermostat on the hopper in proximity to the point of entry of ice for sensing the level of ice, and an agitator for the mass of ice to prevent congealing or agglomeration in order to maintain the ice particles in discrete, free flowing form. An opening at the bottom of the hopper enables ice to be removed from the hopper, for example by a dispensing unit which automatically dispenses a measured quantity of ice.

In order to precool a beverage before dispensing so that it is not excessively diluted by melt down of added ice, or in the event that customer desires his beverage without ice, the beverage may conveniently be made to flow through a cold plate prior to dispensing. A cold plate usually consists of a cast aluminum plate of rectangular shape and in which is embedded stainless steel tubing through which the beverage is flowed. Cold plates conventionally are installed either in separate ice pans or in the bottom of potable ice bins, and are maintained covered with ice to cool the cold plate itself and therefore a beverage flowing therethrough. Should the cold plate be in a separate ice pan, it is then necessary to continuously monitor the quantity of ice in the pan and to manually add ice as necessary. In the case where the cold plate is in the bottom of a potable ice bin for an ice dispenser, an ice maker associated with the dispenser maintains the cold plate immersed in ice, so that operator supervision and intervention is not required. A difficulty that arises in the latter situation, however, concerns the questionable cleanability of the cold plate surfaces and within the junctures between the cold plate and the ice bin, which can lead to contamination of the ice and violations of health and sanitation codes. In addition, ice bins are ordinarily of round and/or irregular configuration, which makes installation of cold plates in the bottom of ice bins extremely difficult, if not impossible.

OBJECT OF THE INVENTION

An object of the present invention is to provide a cold plate system for an ice dispenser in which potable ice in a dispenser hopper is maintained free from contamination by the cold plate, and yet the cold plate is automatically and continuously immersed in ice from the hopper.

Another object of the invention is to provide such a system wherein the cold plate is maintained in an ice pan separate from the potable ice hopper and wherein the ice pan and hopper are interconnected by an ice feed conduit through which ice from the hopper flows at necessary to maintain ice in the ice pan and around the cold plate.

SUMMARY OF THE INVENTION

In accordance with the present invention, in combination with an ice dispenser of a type having a hopper for storage of a mass of small particles of ice and means for dispensing ice from said hopper, there is provided a container for holding a quantity of ice, a cold plate in the container, and means extending between said hopper and said container for conveying ice from said hopper to said container to maintain a supply of ice in said container in contact with said cold plate.

Preferably, the ice dispenser includes an agitator in said hopper for the mass of ice and an ice maker for manufacturing ice and introducing the ice into said hopper, and the container comprises an ice pan for holding a quantity of ice. Said ice pan is beneath said hopper, and said means extending between said hopper and said ice pan comprises a conduit communicating at an upper end with an opening in said hopper and at a lower end with an opening in said ice pan, so that particles of ice gravitate through said conduit from said hopper to said ice pan.

Other objects, advantages and features of the invention will become apparent upon a consideration of the following detailed description, when taken in conjunction with the accompanying drawing.

BRIEF DESCRIPTION OF THE DRAWING

The single drawing FIGURE is a side elevation view, partly in cross section, illustrating a cold plate system for an ice dispenser in accordance with the teachings of the present invention.

DETAILED DESCRIPTION

There is illustrated in the accompanying drawing an embodiment of a cold plate system for an ice dispenser which is presently contemplated as the best mode of carrying out the invention. As shown, an ice dispenser, indicated generally at 10, is conventionally comprised of a hopper, bin or tank 12 for storing a large mass of crushed, cracked, flaked or cubed ice, such as 50 pounds, a rotary impeller or agitator 14 driven by an electric motor 16, and means 18 for accommodating controlled discharge of ice from the lower end portion of the hopper through a discharge opening 20. The means 18, although not forming a part of the present invention, is highly desirable to enable convenient dispensing of ice in the hopper, and may take the form of any of the dispensing means disclosed in U.S. Pat. Nos. 3,165,901, 3,211,338 and 3,217,509, to which reference is made for a more detailed description.

The hopper 12 is essentially an open top tub, the major part of which comprises a main upper hopper portion which may be of circular or other cross section, but preferably is a polygonal cross section as disclosed in U.S. Pat. No. 3,517,860 to facilitate maintaining the particles of ice in discrete, free flowing form. The bottom of the hopper is provided with a circular depression comprising an annular trough 22 in which the discharge opening 20 is formed. The opening is spaced a short distance above the bottom of the trough, and the trough is appropriately provided at its bottom with melt water drain holes (not shown) so that only discrete particles of relatively dry ice will be discharged through the opening. The bottom of the hopper is closed by an end wall 24, so that ice to be discharged gravitates into and is confined within the trough.

The hopper may be made in any conventional manner, such as by deep drawing of sheet metal or the molding of plastics, and when completed is sheated in insulation and provided with a removable insulated cover, all as is well known in the art.

The bottom wall 24 of the hopper is centrally apertured for upward, liquid sealed passage therethrough of a shaft 26 of the motor 16, the motor being suitably mounted on the wall exteriorly of the hopper. Fastened to the motor shaft within the interior of the hopper is the impeller 14 which has a plurality of radial arms 28 that generally follow the contour of the bottom wall of the hopper and extend into the trough and engage the mass of ice in the hopper to cause the same to rotate. A rod 30 extends from side to side and top to bottom within the hopper and provides a fixed resistance against which the rotating mass of ice may be moved to facilitate agitation and separation thereof into discrete, free flowing particles. The motor 15 may comprise an electric gear motor coupled with the discharge means 18, such that the motor is operated for a short interval of time during operation of the discharge means to provide a free flow of ice particles therethrough.

To maintain a supply of ice in the hopper and to replenish ice discharged through the means 18, an ice maker 32 has an ice outlet or ice discharge spout 34 in communication with the open upper end of the hopper. The ice maker may be of any conventional type, and provides crushed, cracked, flaked or cubed ice to the hopper. Although the ice maker is shown positioned at the upper end of the hopper, the actual positioning of the ice maker is not critical, and the ice maker may be mounted in any convenient location, for example below the hopper with manufactured ice being carried into the hopper by any convenient means, such as by a spiral drive.

To control operation of the ice maker in order to maintain ice in the hopper at a selected level, a thermostat 38 is mounted on an inside wall of the hopper in proximity with the ice spout 34 and at the level at which the ice is to be maintained, and senses the presence or absence of ice therearound by means of the surrounding temperature. Since as ice fills the hopper it tends to build up higher in the hopper near its point of entry, by positioning the thermostat thereat overfilling of the hopper is prevented.

The thermostat is connected with a control system 40 for operating the ice maker and the agitator. The control system may operate in a conventional manner, so that upon ice occurring around the thermostat the ice maker is turned off and the agitator motor is energized for a predetermined period to rotate the agitator and level the mass of ice within the hopper. If the hopper is less than completely full, upon leveling the ice drops away from the thermostat, whereupon the ice maker again operates. Since ice builds up faster near its point of entry into the hopper, sensing of ice by the thermostat and cyclic operation of the ice maker and agitator motor usually occur several times before the overall level of the ice in the hopper is sufficiently high that ice remains about the thermostat after agitation, whereupon the ice maker remains off until enough ice is discharged from the hopper to drop its level to beneath the thermostat. Preferably, however, the control system operates as disclosed in copending application Ser. No. 928,242 of Benjamin D. Miller, which is assigned to the assignee of the present invention, such that the ice maker continuously operates whenever it is necessary to fill the hopper and until such time as the hopper is completely full. In this manner, the ice maker is cycled on and off a minimum number of times, and the operating life of the ice maker is significantly extended.

In a conventional use of the ice dispenser 10 with a cold plate, to precool a beverage into which potable ice may be dispensed the cold plate is either mounted within a separate ice pan or within the hopper 12. Should the cold plate be in a separate ice pan, then it is necessary for an operator to monitor the quantity of ice in the pan to ensure that the cold plate remains covered by ice, and to replenish the ice as necessary. If the cold plate is in the hopper, although it is continuously surrounded by ice because of the ice maker 32, most cold plates are of a standard rectangular configuration and installation of the same in a round and/or irregularly shaped hopper is extremely difficult. Further, health and sanitation codes are becoming stricter in connection with placement of cold plates within potable ice hoppers due to the questionable cleanability of cold plate surfaces, and in particular to the cleanability of the junctures between a cold plate and the ice hopper, which can lead to contamination of the ice.

In accordance with the present invention, a cold plate system for an ice dispenser includes an ice pan in which is mounted a cold plate. The ice pan is connected with the ice dispenser hopper through an ice feed conduit, and ice in the hopper passes through the conduit and into the ice pan to surround and cool the cold plate. Feed of ice through the conduit is automatic, so that the cold plate is continuously surrounded by ice while at the same time is separate from the hopper. Thus, there is no contamination of the ice in the hopper and the invention provides all of the advantages associated with prior techniques without any of the disadvantages thereof.

Referring again to the drawing, in accordance with the present invention a cold plate 42 is in an insulated ice pan 44. The cold plate, as is conventional, may consist of a cast aluminum plate, and has at least one pair of fluid connections 46 defining an inlet to and an outlet from a length of stainless steel tubing embedded in the plate. In use the cold plate is surrounded by ice and cooled, so that a beverage flowing through the tubing is cooled. One or more drains 48 are provided to carry away water produced by melt down of ice surrounding the cold plate, and the cold plate preferably is pitched toward the drain to facilitate water runoff.

The ice pan 44 is provided with an insulated cover or top 50 which defines with the ice pan a chamber or space 52 for storage of ice for cooling the ice plate 42, and a removable door 54 in the cover enables access to the interior of the structure for cleaning. The upper end of the cover has an opening in communication with one end of an insulated ice feed means or conduit 56, and an opposite end of the conduit communicates with the interior of the hopper 12 through an opening in a bottom wall of the trough 22.

In operation, movement of ice in the hopper 12 by the agitator 14 facilitates entry of ice into the upper end of the conduit 56 for gravitation therethrough and into the ice pan 44 to fill the space 52 and the interior of the conduit until the level of ice rises to the top of the conduit. When this occurs ice feed to the cold plate automatically stops, and then later automatically continues upon depletion of ice in the ice pan through melt down. Thus, the cold plate is automatically maintained covered by ice, which is a necessary condition for proper cooling of fluids passed through the cold plate tubing.

It is understood, of course, that means other than the conduit 56 could be used to transfer potable ice from the hopper to the cold plate. For example, instead of the conduit a mechanical type of ice feed could be employed for the transfer of ice from the hopper to the ice pan, such as a screw feed mechanism. Of course, in use of a mechanical feed mechanism a separate thermostat would be positioned within the space 52 to detect the level of ice therein to control operation of the mechanism.

The invention thus provides all of the advantages of existing cold plate systems with none of the disadvantages thereof. To this end, since the cold plate and the ice pan are remote from and out of contact with potable ice in the hopper, sanitation problems have been eliminated and the ice hopper cannot become contaminated. At the same time, however, ice is automatically maintained about the cold plate without manual intervention, so that there is no possibility of inadequate or failure of cold plate cooling through operator neglect.

While embodiments of the invention has been described in detail, various modifications and other embodiments thereof may be devised by one skilled in the art without departing from the spirit and scope of the invention, as defined by the appended claims.

What is claimed is:

1. In combination with an ice dispenser of a type having a hopper for storage of a mass of small particles of ice and means for dispensing ice from said hopper, a container for holding a quantity of ice, a cold plate in said container, and means extending between said hopper and said container for automatically conveying ice from said hopper to said container to maintain a supply of ice in said container in contact with said cold plate, wherein *said container is beneath said hopper and said ice conveying means comprises a conduit through which particles of ice gravitate from said hopper to said container and* said ice dispenser includes an agitator in said hopper for maintaining the mass of ice in free flowing form and for facilitating entry of ice into said conduit for gravitation to said container.

[2. The combination as in claim 1, wherein said container is beneath said hopper and said ice conveying means comprises a conduit through which particles of ice gravitate from said hopper to said container.]

3. The combination as in claim [2] *1*, said conduit comprising a vertically extending tube communicating at an upper end with an opening in a bottom wall of said hopper and at the lower end with said container.

4. In combination with an ice dispenser of a type having a hopper for storage of a mass of small particles of ice, an agitator in said hopper for moving the mass of ice, an ice maker for manufacturing ice and for introducing the ice into said hopper, and means for dispensing ice from said hopper, an ice pan for holding a quantity of ice, a cold plate in said ice pan, and means extending between said hopper and said ice pan for conveying ice from said hopper to said ice pan to maintain a supply of ice in said ice pan in contact with said cold plate.

5. The combination as in claim 4, wherein said ice pan is beneath said hopper and said ice conveying means comprises a conduit communicating at an upper end with an opening to said hopper and at a lower end with an opening to said ice pan so that particles of ice gravitate through said conduit from said hopper to said ice pan, said agitator maintaining the mass of ice in free flowing form and facilitating entry of ice into said conduit from said hopper.

6. The combination as in claim 5, said hopper having an annular trough and said upper end of said conduit communicating with an opening in a bottom wall of said trough.

7. The combination as in claim 5, said conduit extending in a vertical run between said hopper and said ice pan.

8. The combination as in claim 5, including a cover for said ice pan, said conduit communicating at its lower end with an opening in said cover.

9. In combination, an ice dispenser of a type having a hopper for storage of a mass of small particles of ice, an agitator in the hopper for moving the mass of ice, an icemaker for manufacturing and introducing ice into the hopper, outlet means for dispensing ice from said hopper, a container for holding a quantity of ice, a cold place in said container, and means responsive to a decrease in the amount of ice in said container for automatically conveying ice from said hopper to said container to maintain a supply of ice in said container in contact with said cold plate.

* * * * *

UNITED STATES PATENT AND TRADEMARK OFFICE

CERTIFICATE OF CORRECTION

PATENT NO. : Re 34,465
DATED : December 7, 1993
INVENTOR(S) : Robert M. Koeneman and Albert L. Schafer

It is certified that error appears in the above-identified patent and that said Letters Patent is hereby corrected as shown below:

Column 2, line 5, delete "at", insert --as--;
line 62, delete "is a", insert --is of --

Column 3, line 25, delete "15", insert --16--;

Column 5, line 27, delete "of", insert --for--;

Column 6, line 44, delete "place", insert --plate--.

Signed and Sealed this

Twenty-sixth Day of July, 1994

*Attest:*

*Attesting Officer*

BRUCE LEHMAN

*Commissioner of Patents and Trademarks*